United States Patent
Okano et al.

(10) Patent No.: US 6,742,917 B2
(45) Date of Patent: Jun. 1, 2004

(54) VANITY MIRROR

(75) Inventors: Hirofumi Okano, Saitama Prefecture (JP); Tetsuo Mochida, Saitama Prefecture (JP)

(73) Assignee: Kabushiki Kaisha T AN T, Kawagoe (JP)

( * ) Notice: Subject to any disclaimer, the term of this patent is extended or adjusted under 35 U.S.C. 154(b) by 168 days.

(21) Appl. No.: 09/940,531

(22) Filed: Aug. 29, 2001

(65) Prior Publication Data

US 2002/0126496 A1 Sep. 12, 2002

(30) Foreign Application Priority Data

Mar. 7, 2001 (JP) .......................................... 2001-63153

(51) Int. Cl.⁷ ................................................ B60Q 3/02
(52) U.S. Cl. ........................ 362/492; 362/135; 362/136; 362/137; 362/155
(58) Field of Search ..................... 362/492, 135–137, 362/155

(56) References Cited

U.S. PATENT DOCUMENTS

| | | | | |
|---|---|---|---|---|
| 4,511,954 A | * | 4/1985 | Marcus et al. ............... | 362/492 |
| 4,760,503 A | * | 7/1988 | VandenBerge et al. ...... | 362/492 |
| 4,947,296 A | * | 8/1990 | Takeuchi et al. ........... | 296/97.5 |
| 5,091,831 A | * | 2/1992 | Van Order et al. .......... | 362/490 |
| 5,184,888 A | * | 2/1993 | Sakuma et al. ............. | 362/136 |
| 5,203,623 A | * | 4/1993 | Viertel et al. ............... | 362/135 |
| 5,651,605 A | * | 7/1997 | Corn .......................... | 362/492 |
| 6,076,947 A | * | 6/2000 | Miller ........................ | 362/492 |
| 6,386,741 B1 | * | 5/2002 | Jones et al. ................. | 362/492 |

\* cited by examiner

Primary Examiner—Sandra O'Shea
Assistant Examiner—James W Cranson
(74) Attorney, Agent, or Firm—Nixon & Vanderhye, PC

(57) ABSTRACT

Vanity mirrors are provided with a body base member having a mirror, and an illumination member detachably mounted to the body base member. The illumination member includes a lens plate and an elongate lamp tube having one and another terminal ends between which electrical current may pass to illuminate the lamp, and thus the mirror. The illumination member is provided with a planar base plate having a pair of spaced-apart base contact terminals adapted to being connected to lamp circuit leads through which electrical current may be supplied to the lamp tube. The lamp tube is positioned on an upper side of the base plate and has one terminal end thereof soldered to one of the base contact terminals. A contact piece is positioned on the upper side of the base plate and has an end thereof soldered to the other terminal end of the lamp member. The contact piece is operably associated with a switch mechanism so as to make and break an electrical circuit with the other of the base contact terminals in response to a mirror cover being moved into the opened and closed conditions so as to turn the lamp tube on and off, respectively, and thereby illuminate the mirror.

4 Claims, 7 Drawing Sheets

US 6,742,917 B2

VANITY MIRROR

BACKGROUND OF THE INVENTION

The present invention relates to an improved vanity mirror and more particularly to a vanity mirror which is capable of involving a fewer number of parts involved as well as reducing the thickness of the vanity mirror.

Some vanity mirrors used in the automobile, particularly those attached to the sun visor therein, use a lamp for illumination purposes during the night operations for the passenger's sake.

FIG. 7 and FIG. 8 shows a conventional vanity mirror, in which the numeral 20 denotes a vanity mirror composed of a body base 22 centrally attached with a mirror 21, a cover 23 openably attached to said body base 22 by way of a hinge mechanism and lamp sections 24 attached to the opposite sides of said mirror 21 and adapted to be powered on and off through opening of said cover 23.

Further, said lamp sections 24 are composed of recesses 221 formed on both sides of said mirror 21 in the body base 22, lamp holding metal members 25 attached in said recesses 221 from the reverse side thereof and fuse type lamps 26 held by holding pieces 251 attached on the body base 22 to forwardly project therefrom.

Each fuse bulb 26 is connected to bus bars 27 by way of each bulb holding metal member 25. One of said bus bars 27 is attached a lead wire L connected thereto from an automotive power source (not shown).

Said cover 23 is formed with protuberance 231, which is adapted to press a bent terminal piece 28 provided at a reverse side of the body base 22 to have a lead wire L connected thereto. Thereby, the fuse bulb 26 is turned on as a result of said terminal piece 28 being brought into contact with the bus bar 27. Further, the closure of the cover 23 causes the protuberance 231 formed on the cover 23 is detached from the terminal piece 28 such that the terminal piece 28 returns to its original position by virtue of its resiliency to remove the electrical connection and turn off the fuse bulb.

However, the vanity mirror 20 with the above structure has the fuse bulb 26 retained by the holding pieces 251 which are in need of a certain extent of thickness and there is a limit no matter how strenuously an effort is made to produce as thin a vanity mirror as possible.

There is another problem that the need for connection of each fuse bulb 26 to a bus bar 27 by way of the bulb holding metal member 25 causes the manufacturing cost to increase.

SUMMARY OF THE INVENTION

The present invention has been made to solve the afore discussed problems and its object is to provide a vanity mirror which is as thin as possible and capable of having the manufacturing cost as low as possible by having a fewer number of parts. Therefore, the vanity mirror of the invention essentially comprises a body base having a mirror attached thereto; a cover plate openably attached to said body base through a hinge mechanism; a switch turned on and off though opening and closing of said cover plate; and an illumination unit composed of a lamp connected to lead wires and a lens plate adapted to be attached and detached to said base plate; said illumination unit detachably attached to body base body base.

BRIEF DESCRIPTION OF THE DRAWINGS

FIG. 6 shows a position when the lamp of the illumination unit is turned on;

DETAILED DESCRIPTION OF THE EMBODIMENT

Hereinafter, the vanity mirror according to the present invention will be explained in the form of one embodiment.

Figure 1:
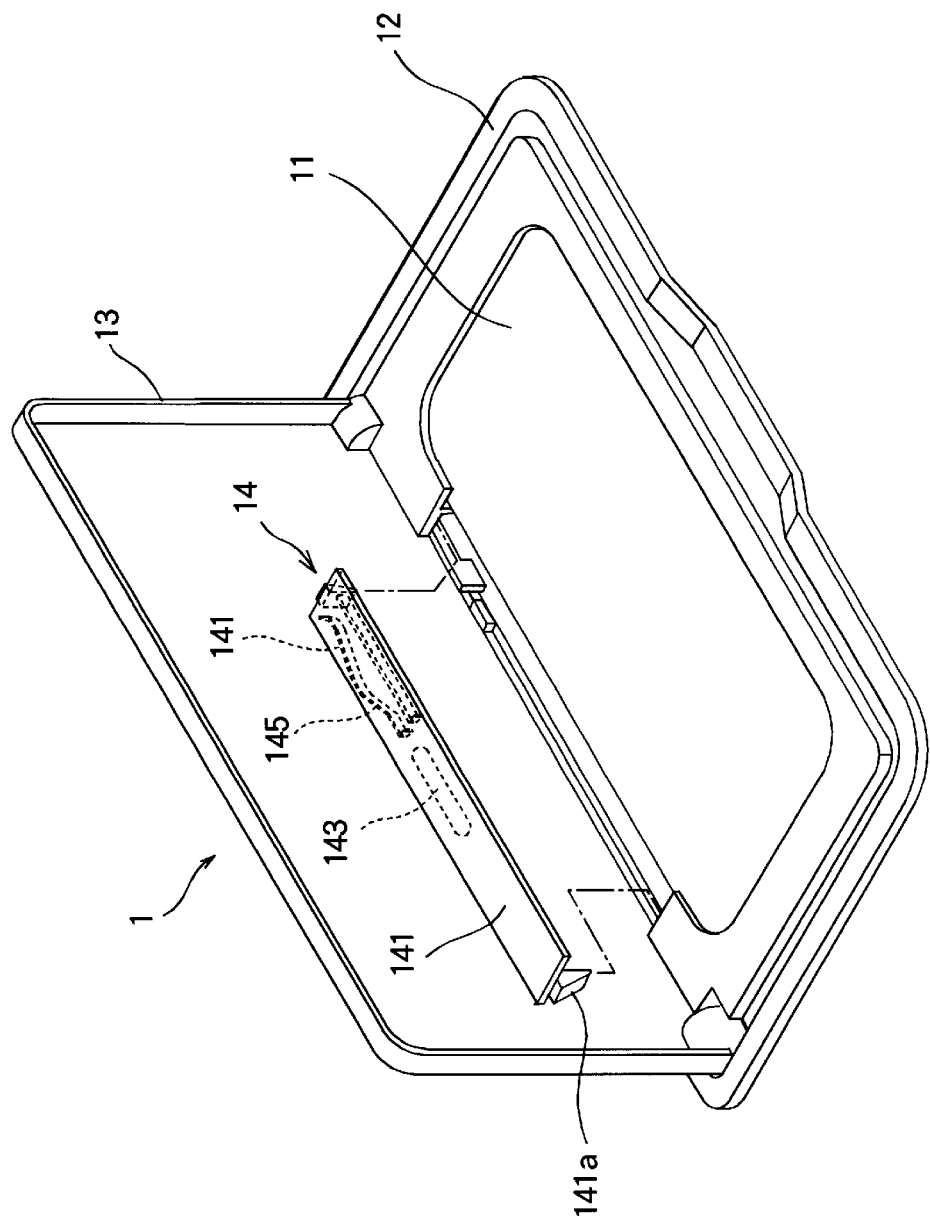
FIG. 1 is a perspective view of the vanity mirror according to the invention.
Figure 2:
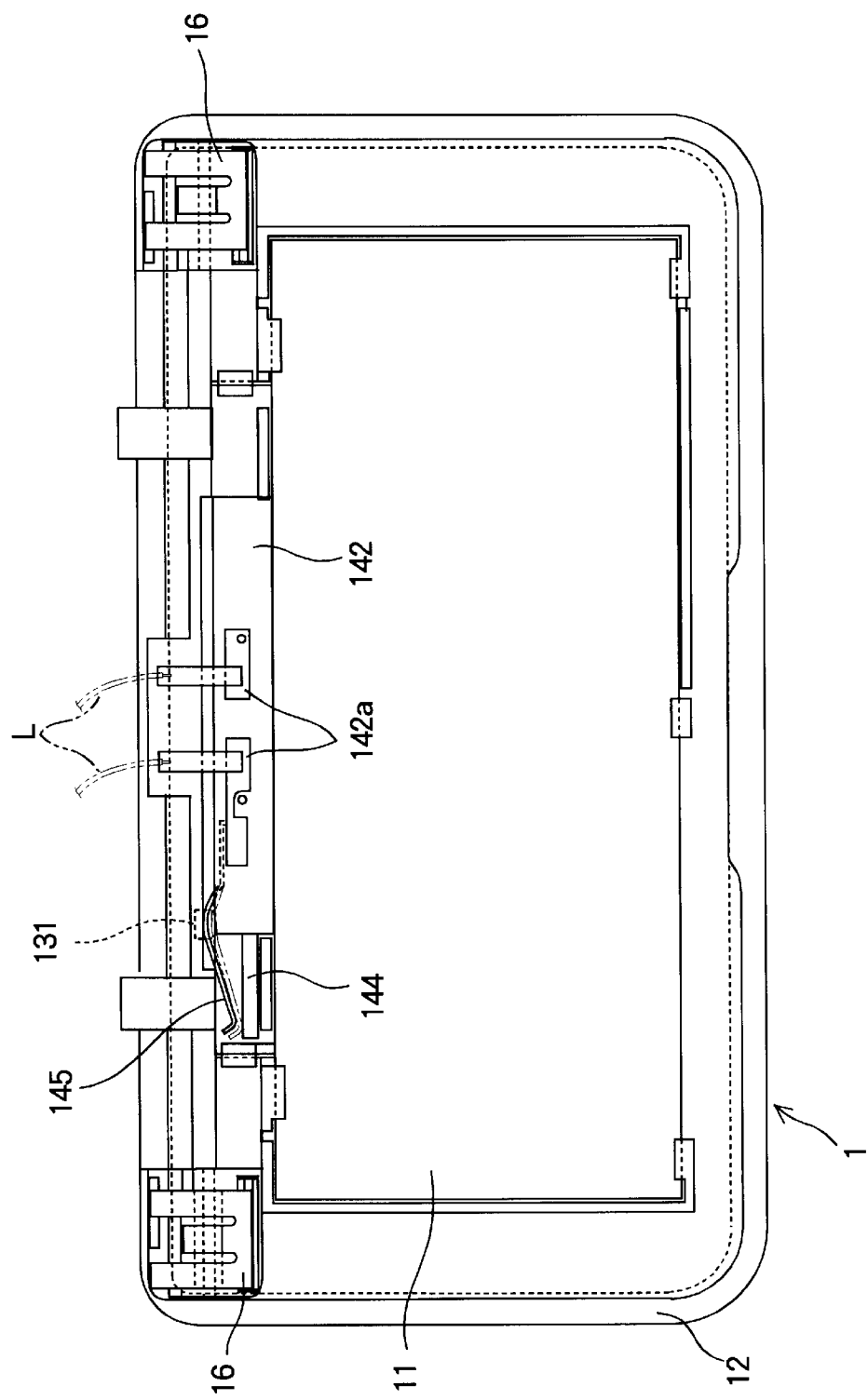
FIG. 2 is a bottom view thereof.
Figure 3:
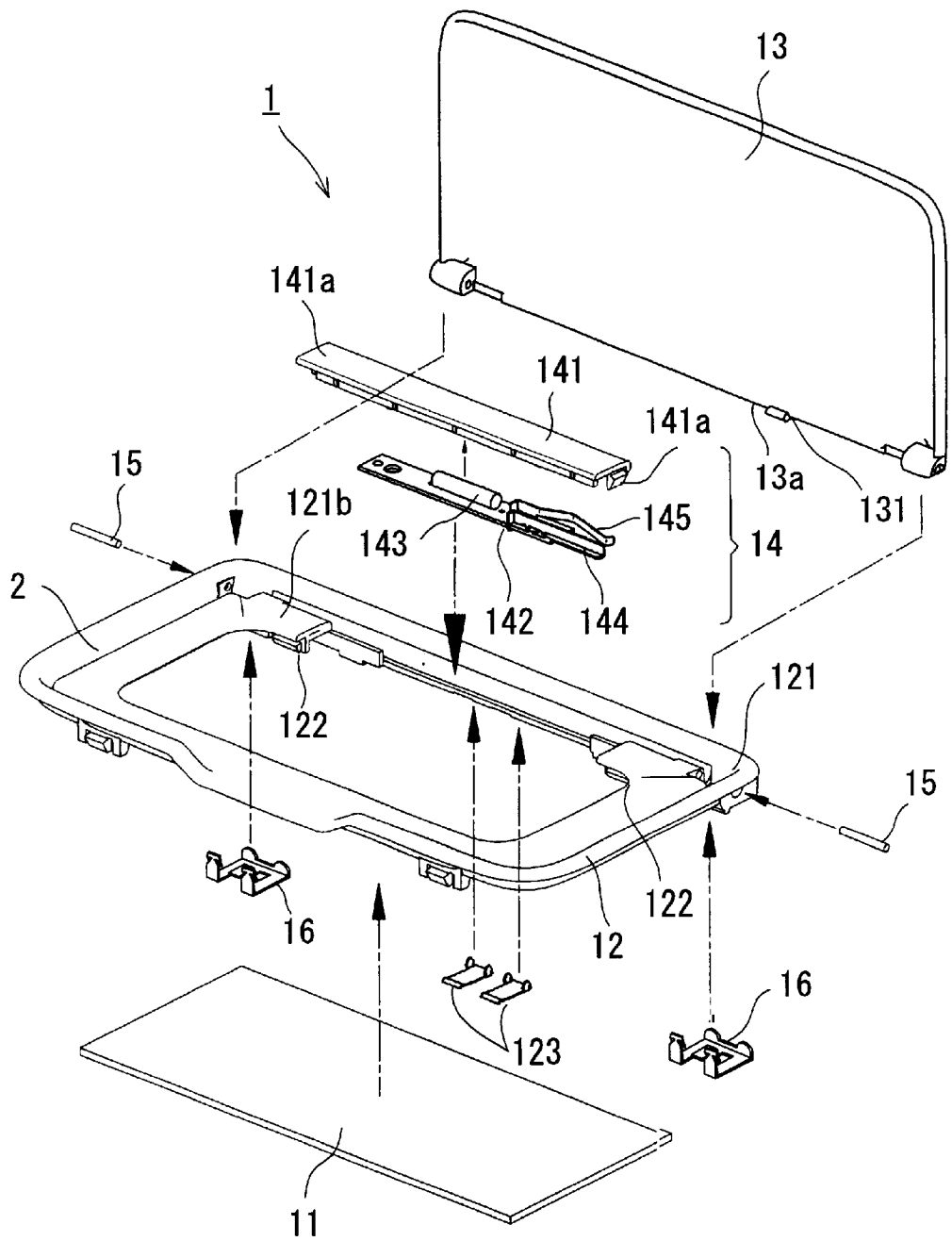
FIG. 3 is an exploded perspective view thereof.
Figure 4:
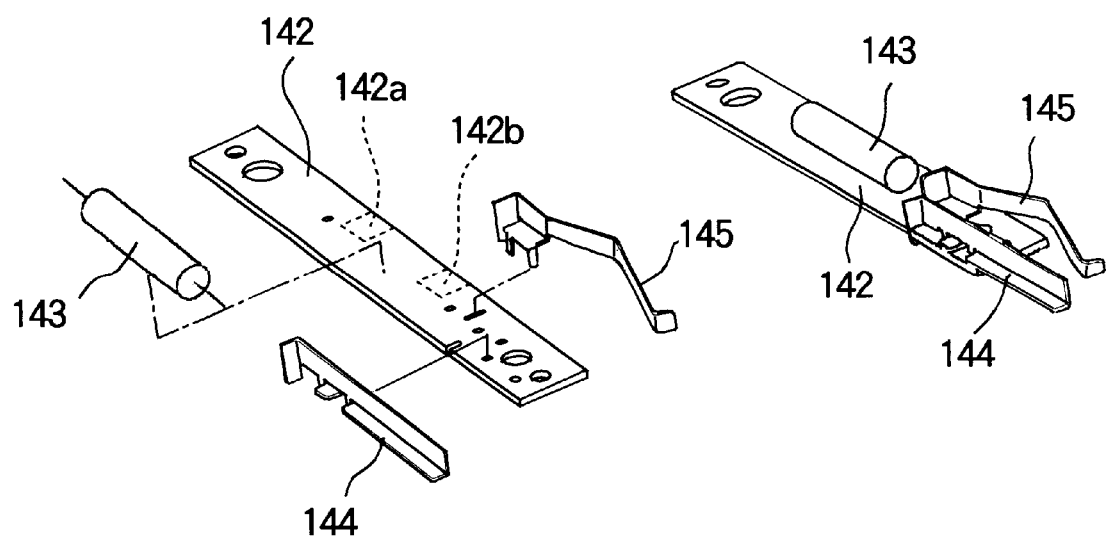
FIG. 4 is a perspective view of the disassembled illumination unit.

First of all, the entire structure of the vanity mirror according to the invention will be discussed referring to FIG. 1 through FIG. 4. Here, FIG. 1 is a perspective view of the vanity mirror according to the invention; FIG. 2 is a bottom view thereof; FIG. 3 is an exploded perspective view thereof; and FIG. 4 is a perspective view of a disassembled illumination unit.

In those figures, the numeral 1 denotes a vanity mirror of the invention. Said vanity mirror 1 is a similar type to the one in the prior art which is to be attached to a sun visor in the automobile and is composed of a mirror body 11 centrally provided in a body base 12, a cover 13 openably attached to said body base 12 by way of a hinge mechanism and illumination unit 14 attached to the top of said mirror body 11 and adapted to be powered on and off through opening and closing of said cover 13.

More specifically, the body base 12 constituting the vanity mirror 1 is a plate-like member centrally provided with a bulging frame section 121 to define an opening therein. Said frame section 121 is provided with a mirror body 11 attached from the reverse side of the body base 12 and secured therein by means of holding pieces 122.

The upper side of said frame section 121 is cut out to receive therein the illumination unit 14 (which will be detailed later) such that said illumination unit 14 is detachably attached thereto by means of engaging pieces 141a provided at its ends thereof. Further, said upper side of the frame section 121 is provided with plus and minus terminals 122 connected to the lead wire which supplies power from the automotive power source.

Next, the cover 13 is a plate member formed to be engaged in the body base 12. Said cover 13 has a longitudinal side 13a with opposite ends thereof adapted to be supported to the body base 12 by means of pins 15 and further secured by channel-shaped fixing metal members 16 attached thereto from the reverse side of the body base 12 such that the cover 13 may be opened and closed relative to the body base 12 by virtue of the hinge mechanism. Further, as will be explained later, said side 13a of the cover 13 is formed with a protuberance 131 to perform a switch-on and switch-off role in the illumination unit 14 through opening and closing of the cover 13.

Next, the illumination unit 14 is composed of a rectangular lens plate 141, a base plate 142 adapted to be detachably screwed to said lens plate 141 and having two terminals 142a and 142b on its reverse side, a lamp 143 substantially centrally positioned on the upper side of the base plate 142 and adapted to be soldered at one end thereof to the terminal 142a, a contact piece 144 soldered to the other end of said lamp 143 to be attached to the top face of the base plate 142 and a longitudinal terminal piece 145 to be connected to the other terminal 142b attached to the reverse side thereof. In this connection, said lamp 143 is a both side type lamp having lead wires extending from both sides thereof.

Said lens plate 141 is formed with the engaging pieces 141a at opposite ends thereof, said engagement pieces 141a helping detachably attach the lens plate 141 to the upper side 121b of said frame section 121.

Further, the terminals 142a and 142b provided on the reverse side of the base plate 142 are electrically connected to the terminals 123 provided with the body base 12 when the illumination unit 14 is loaded with the body base 12. Further, the longitudinal terminal piece 145 is bent at an intermediate portion thereof to define an obtuse angle therein to provide a resiliency such that said terminal piece 145 acts as a switch for the illumination unit 14.

Figure 5:
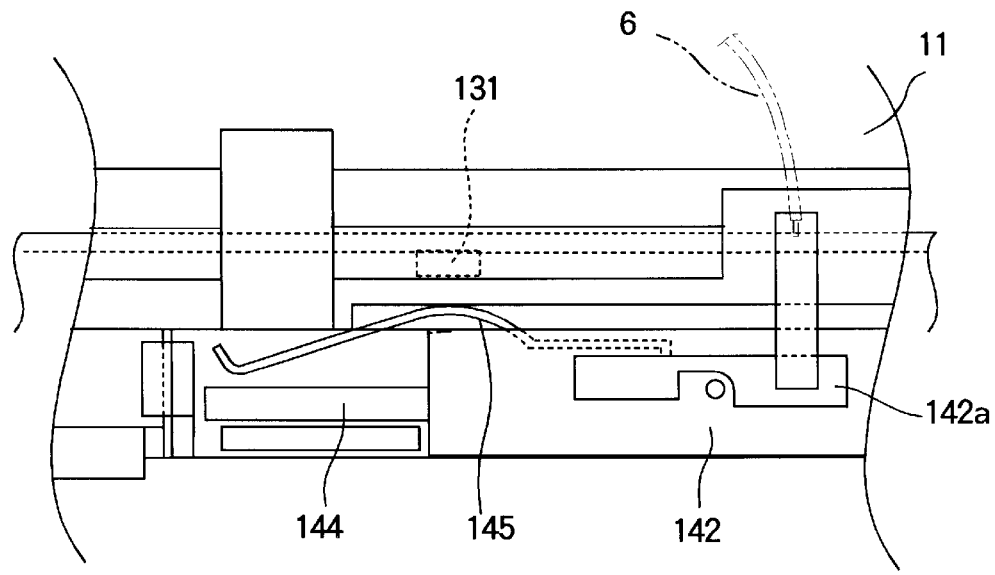
FIG. 5 shows a position when the lamp of the illumination unit is turned off.
Figure 6:
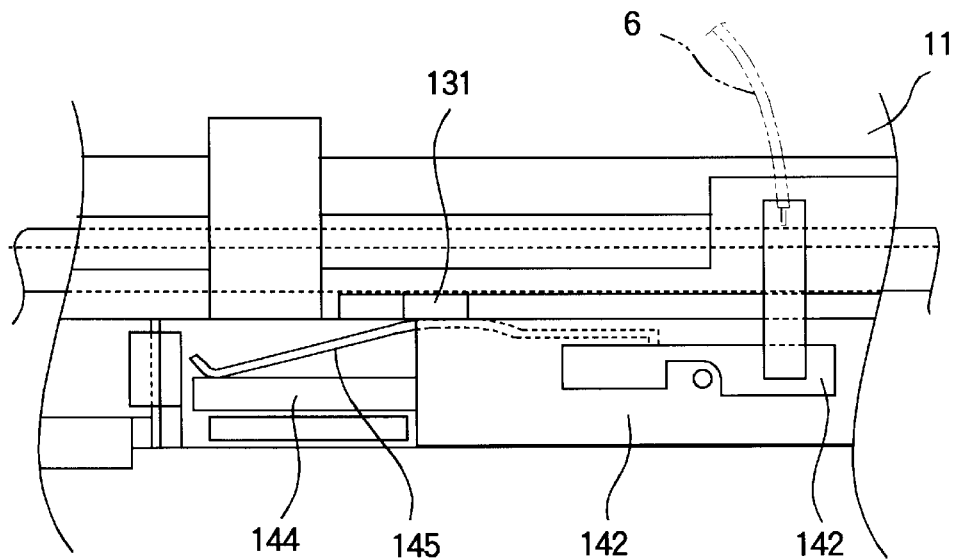
Figure 7:
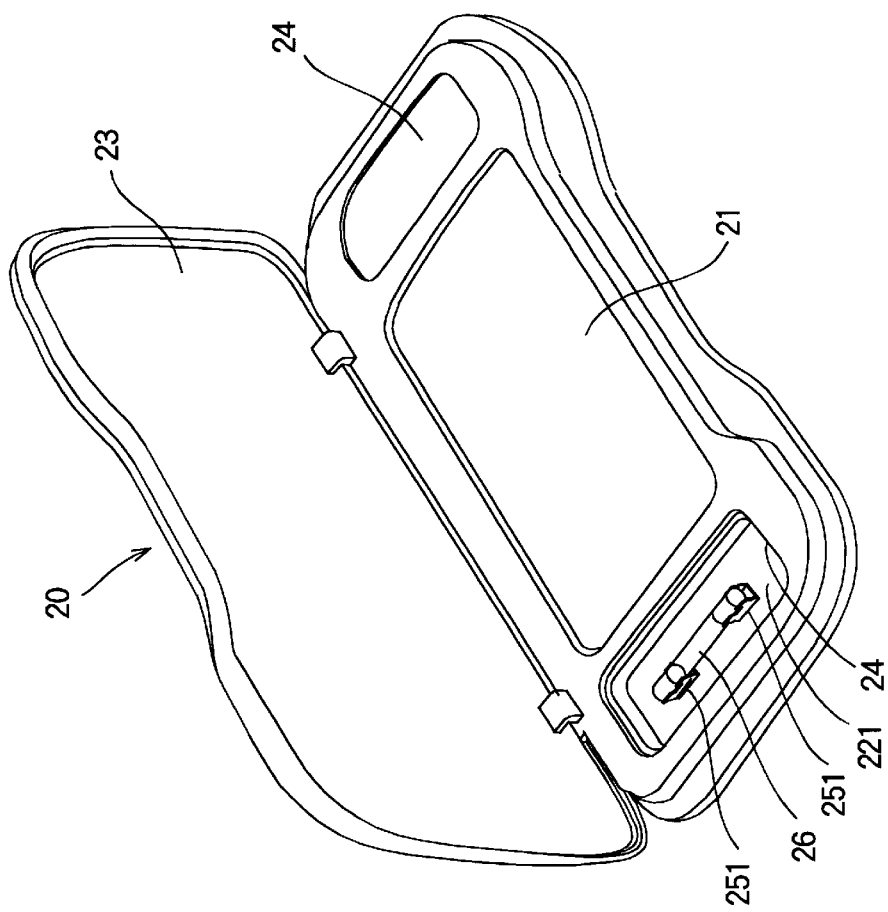
FIG. 7 is a perspective view of the conventional vanity mirror.
Figure 8:
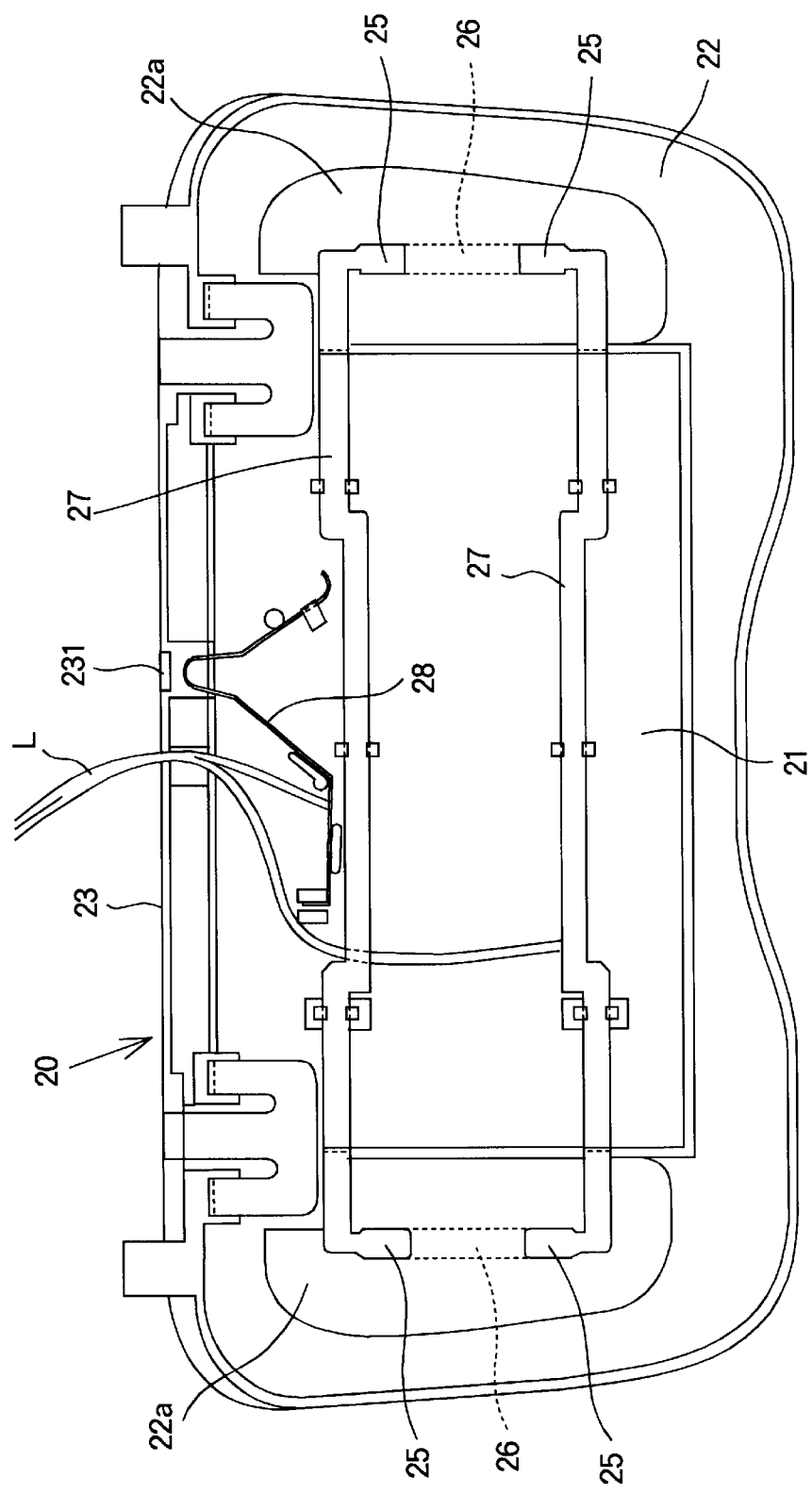
FIG. 8 is a bottom view of the conventional vanity mirror.

Next, with reference to FIG. 5 and FIG. 6, a lighting operation of the lamp 143 in the illumination unit 14 will be explained. FIG. 5 shows a position when the lamp of the illumination unit is turned off. FIG. 6 shows a position when the lamp of the illumination unit is turned on.

First, when the cover 13 is closed as shown in FIG. 5, the protuberance 131 formed in the cover 13 is out of contact with the terminal piece 145 such that said terminal pieces 145 is kept away from the contact piece 144, turning off the switch of the illumination unit 14.

Next, when the cover 13 is opened as shown in FIG. 6, the protuberance 131 formed in the cover 13 is abutted against the terminal piece 145 of the illumination unit 14 to press the same. As a result, the terminal piece 145 is deformed to come into contact with the contact piece 144. As a result, the switch of the illumination unit 14 is turned on to light the lamp 143.

Then, when the cover 13 is closed again, the protuberance 131 formed in the cover 13 is detached away from the terminal piece 145 of the illumination unit 14 such that the contact piece 144 returns to the position shown in FIG. 5 with the result that the contact piece 144 is away from the switch to turn off the switch.

In the event of a breakdown of the lamp 143, the base plate 142 integral with the lamp can be removed from the lens plate 141 and replaced with a new base plate 142 to complete the replacement operation of the lamp 143.

While the explanation has so far given with reference to the above mentioned embodiment in which the base plate 142 is detachably screwed to the lens plate 141, the present invention is not limited to this embodiment but the lens plate may be formed with an engagement protuberance which may be resiliently engaged in a hole formed in the base plate 142 such that the lens plate and the base plate are detachably attached with each other.

As discussed in the foregoing, the invention is composed of a body plate attached with a mirror, a cover plate openably attached to said body base through a hinge mechanism, a switch adapted to be turned on and off by opening and closing the cover plate, a base plate to which said switch is attached, an illumination unit having a lamp attached to lead wires extending from opposite ends of said base plate and a lens plate adapted to freely attached to and detached from said base plate. Since said illumination unit is detachably attached to said body base, there is no need to provide holding members as required in the prior art and it is possible to manufacture a thin vanity mirror. Further, since there is no need to use bus bars, it has an advantage that there is no risk of involving a rise of the manufacturing cost.

What is claimed is:

1. A vanity mirror comprising:

a body base member having a mirror;

an illumination member detachably mounted to said body base member which includes a lens plate and an elongate lamp tube for illuminating the mirror through the lens plate, said lamp tube having one and another terminal ends between which electrical current may pass to illuminate the lamp;

a cover plate hinged to said body base member so as to be hingedly moveable between an open condition wherein the mirror is exposed and a closed condition wherein the mirror is covered;

a switch mechanism responsive to movement of the cover plate between said closed and opened conditions; wherein said illumination member includes:
  (i) a planar base plate having a pair of spaced-apart base contact terminals adapted to being connected to lamp circuit leads through which electrical current may be supplied to the lamp tube;
  (ii) said lamp tube being positioned on an upper side of said base plate and having said one terminal end thereof soldered to one of said base contact terminals;
  (iii) a contact piece being positioned on said upper side of said base plate and having an end thereof soldered to said other terminal end of said lamp member, said contact piece being operably associated with said switch mechanism so as to make and break an electrical circuit with the other of said base contact terminals in response to said cover being moved into said opened and closed conditions to turn said lamp tube on and off, respectively, and thereby illuminate the mirror, and wherein
    said body base member includes a pair of body contact terminals each contacting a respective one said base contact terminals when said illumination unit is detachably mounted to said body base member.

2. A vanity mirror as in claim 1, wherein said lamp tube is mounted substantially centrally on said upper side of said base plate.

3. A vanity mirror as set forth in claim 1, wherein said base plate is detachably screwed onto said lens plate.

4. A vanity mirror as set forth in claim 1, wherein said base plate is resiliently engaged with said lens plate.

* * * * *